April 6, 1937. D. FRANKS 2,076,455
MACHINE FOR SEPARATING SEEDS OR THE LIKE
Filed Sept. 30, 1935
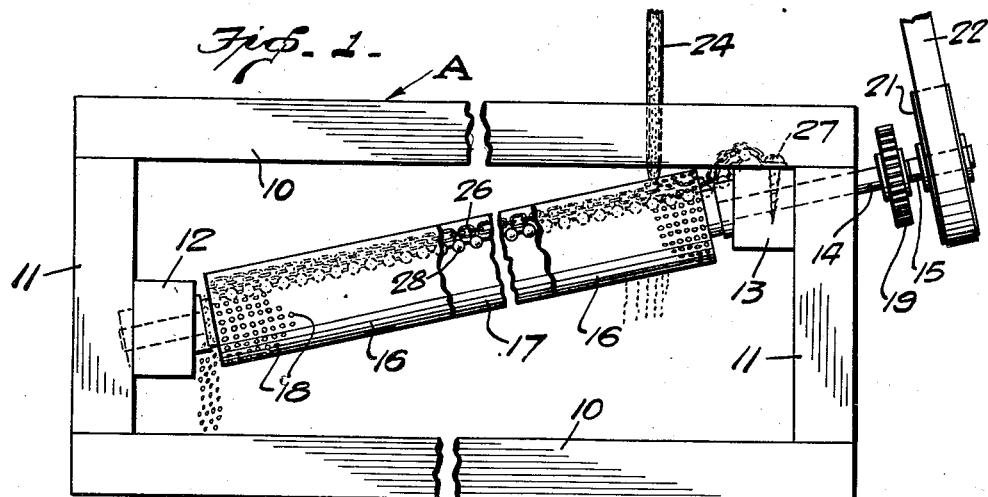
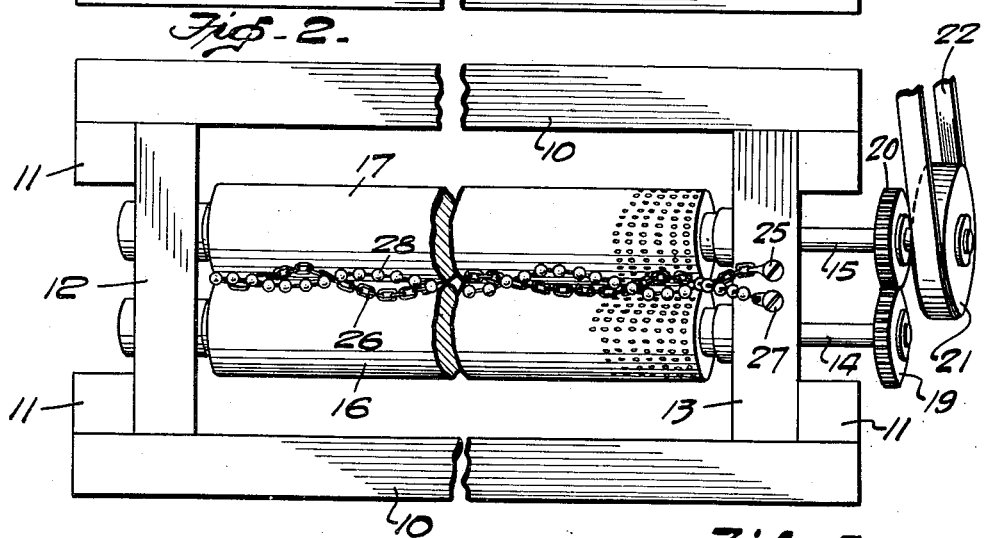
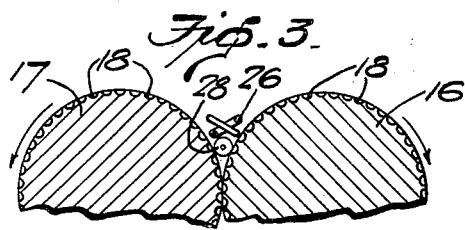
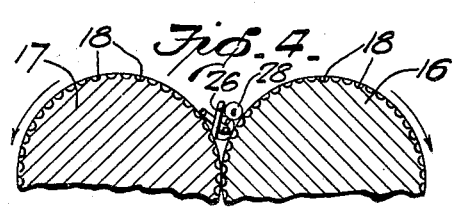
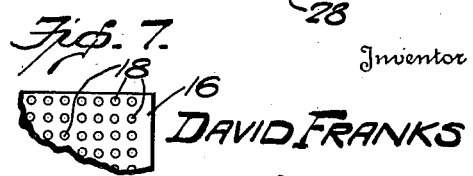
Inventor
DAVID FRANKS
By Norris & Bateman
Attorneys Patented Apr. 6, 1937

2,076,455

UNITED STATES PATENT OFFICE 2,076,455

MACHINE FOR SEPARATING SEEDS OR THE LIKE

David Franks, Millersburg, Ohio, assignor of one-third to Charles K. Franks and one-third to Samuel Franks, Jr., both of Millersburg, Ohio Application September 30, 1935, Serial No. 42,956

9 Claims. (Cl. 209—94)

The present invention relates to machines for classifying or sorting seeds or the like, and it is more particularly concerned with apparatus for separating weed or other undesirable seeds from agricultural seeds.

This invention relates to that class of classifying machines wherein the seed to be classified is introduced into the valley provided between a pair of inclined, pocketed rollers which are rotated in directions upwardly and outwardly of the valley, the weed and other undesirable seeds being carried outwardly by the roller pockets and the good seed gravitating into a suitable receptacle at the lower ends of the rollers.

Machines of this general character have been heretofore proposed, but they have not proved to be altogether satisfactory. One reason why the prior machines have not been fully successful is that the seed has not been properly agitated in the valley, with the result that a considerable quantity of weed seeds migrate the entire length of the valley and are discharged into the good seed receptacle. Some of the prior machines also possessed the further disadvantage of having sweeping devices above the rollers which were found to brush weed seeds back into the valley.

It is accordingly the major object of this invention to devise a novel machine that will thoroughly and efficiently separate or classify grain and similar materials.

It is another important object of the invention to provide seed separating machines of the character having inclined rollers, with a device for efficiently agitating the seeds in the valley between the rollers to attain effective and thorough separating action.

Further objects will appear as the specification proceeds in connection with the annexed drawing, and from the appended claims.

In the drawing:

Fig. 1 is a side elevational view of the seed separating or classifying machine according to the present invention;

Fig. 2 is a top plan view of the machine illustrated in Fig. 1;

Fig. 3 is a transverse sectional view through the rollers of the machine of Figs. 1 and 2 illustrating one position of the agitators;

Fig. 4 is a view similar to Fig. 3 but illustrates the agitators disposed in another position;

Fig. 5 is an enlarged view of a portion of one of the agitators;

Fig. 6 is a view similar to Fig. 5, but illustrates the other agitator; and

Fig. 7 is a fragmental elevational view of one of the rollers.

With continued reference to the drawing, wherein like reference characters have been employed to designate like parts throughout the several views thereof, the supporting structure for the machine may assume any desired form, but a frame A, composed of a plurality of longitudinal members 10 and transverse members 11, is preferably employed.

Journalled in suitable bearings in a pair of cross pieces 12 and 13 are a pair of shafts 14 and 15, upon which are fixed and rigidly mounted a pair of rollers 16 and 17. Each roller is provided with a plurality of depressions or identations 18, which are adapted to receive the weed seeds or other undesirable material, and although their size will be dictated to some extent by the type of seed handled by my machine, it has been found that recesses approximately one-sixteenth of an inch in diameter and one-sixteenth of an inch deep are satisfactory for most weed seeds.

Rollers 16 and 17 may be driven in any suitable manner, but preferably I employ a positive drive comprising a pair of intermeshing gears 19 and 20 mounted on shafts 14 and 15 respectively, and a pulley 21 driven by a belt 22. Rollers 16 and 17 are accordingly intergeared for rotation in opposite directions, but if desired they may be disposed in frictional engagement and in such case only one roller need be driven.

The seed to be separated is fed into the upper end of the valley between the rollers by means of a chute 24 or the like, and as it migrates downwardly in the valley under the influence of gravity, it is acted upon by the rollers and also by the agitators about to be described and which are essential to proper operation of the machine.

Secured to any suitable part of the machine, for instance to cross piece 13 by means of a screw 25, so as to depend downwardly in the valley between the rollers, is an agitator consisting of a link chain 26. Also secured to cross piece 13, by means of a screw 27, is a second agitator consisting of a smaller ball and socket type chain of the general character found on pull switches for electric lamp fixtures. Chains 26 and 28 are flexible throughout their length and are adapted to agitate the seeds and subject the whole body of seeds to the separating action of the rollers many times during the passage of the seeds from the upper to the lower end of the rollers. If desired the lower ends of the chains may be secured to a support, but I preferably leave their lower ends free as they are found to exert a superior agitating action when so supported.

Assuming that the machine is in operation, with the rollers rotating outwardly in the directions indicated by the arrows in Figs. 3 and 4, and with seeds feeding into the valley between the rollers through chute 24, the weed seeds on the outer fringe or strata of the body of seeds will find their way into recesses 18 in rollers 16 and 17 and will be lifted away from the body and dropped from the sides of the rollers. The weed seeds thus separated may be collected in suitable receptacles located beneath the rollers (not shown).

As the body of seed migrates downwardly in the valley between the rollers it engages chains 26 and 28 and is stirred up or agitated throughout its travel to the lower ends of the rollers, with the result that the entire body of material is subjected several times during its passage to the separating action of the rollers. By the time the material has reached the lower ends of rollers 16 and 17 it has been completely freed of weed seeds and other undesirable materials and as it gravitates over the ends of the rollers it may be received in a suitable container (not shown). If desired suitable baffle plates or a spout may be used to catch the cleaned seed and prevent it from falling into or mixing with the separated weed seeds and other material.

Two chains of dissimilar forms are preferably employed because of the peculiar shape of the valley and because of the agitating action which I have found is required in a machine of this character. Beaded chain 28 serves a two-fold purpose. It forms a bottom for the restricted portion of the valley above the line of contact of the rollers and also, by reason of its generally convex upwardly facing surfaces, it causes the seeds to rapidly move from side to side and present themselves alternately to the action of the two rollers. The link chain 26 is larger because the valley is of greater transverse area where it is disposed and it is constructed of open links so that the seeds may pass freely therethrough and simultaneously be subjected to an intensive agitation.

Although I have shown rollers 16 and 17 inclining at the angle shown in the drawing as I have found it to bring about the proper rate of migration of material from the upper to the lower ends of the rollers, it is to be understood that the angle of inclination may be varied if desired to suit different conditions.

Although I have shown a machine embodying a single pair of rollers, it is to be understood that if desired the invention may be embodied in a machine having four or more rollers.

The invention may be embodied in other specific forms without departing from the essential characteristics thereof. The present embodiment is therefore illustrative and not restrictive, the scope of the invention being indicated by the appended claims rather than by the specific disclosure.

I claim as my invention:

1. In a machine for classifying granular materials, a pair of inclined rollers mounted for rotation adjacent each other, said rollers having a plurality of recesses in their peripheries of a size sufficient to receive one, but being sufficiently small to reject the other of the materials to be separated, said rollers defining an inclined material conveying valley, means for feeding granular material into the upper end of the valley between said rollers, and means for thoroughly agitating said material as it traverses said valley in response to rotation of said rollers, for causing it to undergo a selective separation by said rollers as it traverses said valley, comprising at least one flexible element extending substantially parallel to said rollers and freely resting in the body of material between said rollers.

2. In a machine for separating seeds, a pair of adjacent rollers mounted for rotation about axes which are inclined to the horizontal and defining a seed conveying valley between them, said rollers having a plurality of recesses in the periphery thereof which are of a size sufficient to receive one class of seeds and being sufficiently small to reject another class of said seeds, means for feeding seeds to the upper end of the valley between said rollers, and at least two flexible chain-like elements supported to lie in said valley and operable to thoroughly agitate said material as it migrates from the upper end to the lower end thereof in response to rotation of said rollers.

3. The machine described in claim 2, wherein said chain-like elements are supported at a point in proximity to the upper ends of said rollers.

4. The machine described in claim 2, wherein said chain-like elements are supported adjacent the upper ends of said rollers and the lower ends of said chains are unsupported except by said valley between said rollers.

5. The machine described in claim 2, wherein said chain-like elements are of dissimilar characters for exerting different actions upon said seed as it traverses said valley.

6. The machine described in claim 2, wherein said chain-like elements are supported solely at one end at a point in proximity to the upper ends of said rollers and gravitationally rest in the valley between said rollers.

7. In a seed separating machine, at least two rollers disposed in parallel relationship and mounted for rotation in opposite directions about axes inclined to the horizontal, said rollers having a plurality of recesses in their peripheries of a size sufficient to receive one class of said seed and being sufficiently small to reject another class of said seed, said rollers being disposed in closely adjacent side-by-side relationship to define a seed conveying valley, means for feeding seed to the upper end of the valley, and at least one flexible chain freely resting in said valley and having means for supporting the upper end thereof in proximity to the upper end of said rollers, said chain being operable to agitate said seed as it gravitates downwardly in said valley in response to rotation of said rollers and bring it into contact with said rollers for effecting separation thereof.

8. The machine described in claim 2, wherein one of said chain-like elements is constructed of closed link members and is operable to form a bottom closure for said valley, and the other of said chain-like elements is larger and is constructed of open link members and is operable to lie above said one chain-like element.

9. In a machine for separating seeds, a pair of adjacent rollers mounted for rotation about axes which are inclined to the horizontal and defining a seed conveying valley between them, said rollers having peripheral surfaces of a character to pick up seeds of one class and to reject seeds of another class, means for rotating said rollers in directions to cause the adjacent portions of their peripheries to move upwardly and away from the valley between them, means for feeding seeds to the upper end of the valley between said rollers, and at least one chain-like element supported to lie in said valley and operable to thoroughly agitate the seeds as they pass from the upper end to the lower end thereof and to cause the seeds to migrate from one roller to the other roller in response to rotation of said rollers.

DAVID FRANKS.